UNITED STATES PATENT OFFICE.

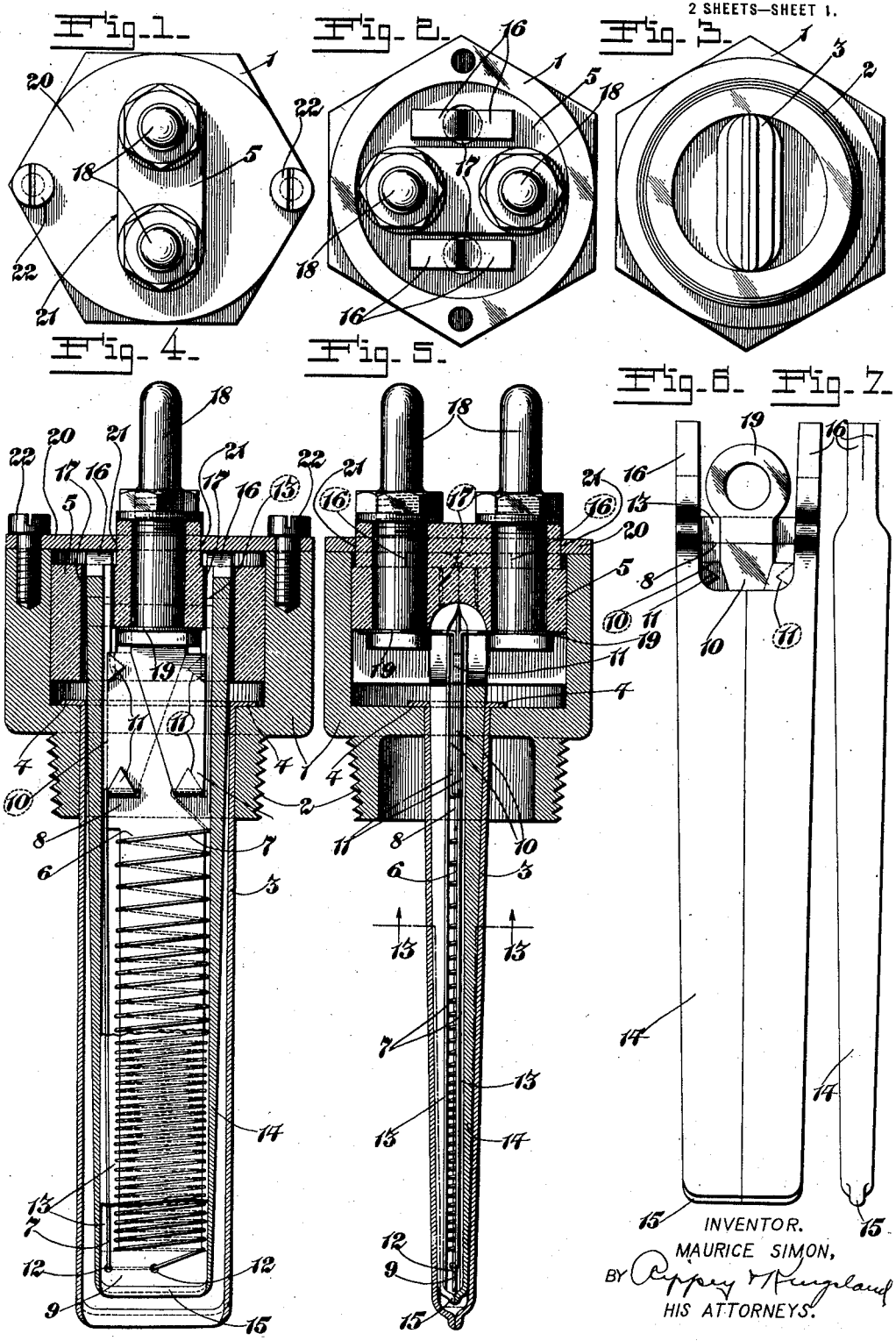

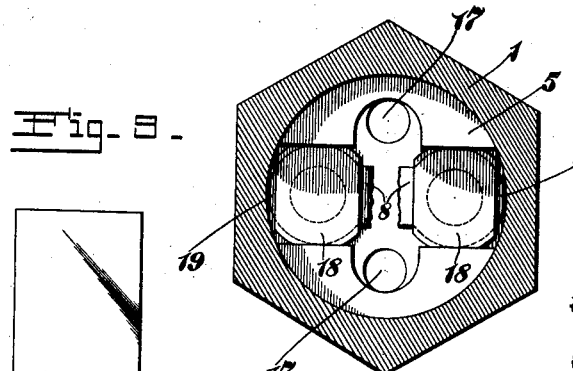
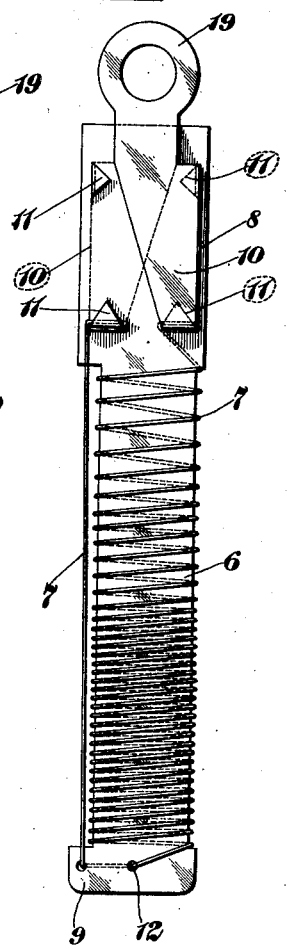
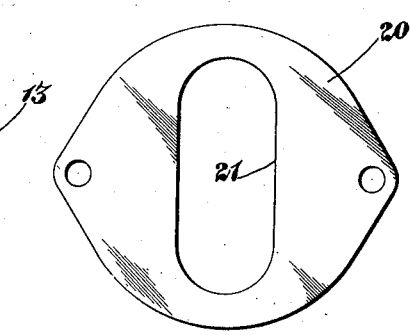
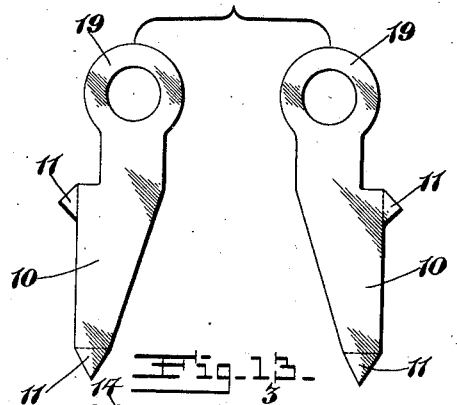
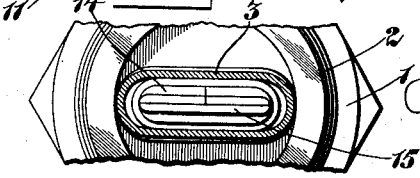

MAURICE SIMON, OF ST. LOUIS, MISSOURI.

ELECTRIC HEATER.

1,416,897.  Specification of Letters Patent.  Patented May 23, 1922.

Application filed July 12, 1920. Serial No. 395,451.

*To all whom it may concern:*

Be it known that I, MAURICE SIMON, a citizen of the United States, residing at the city of St. Louis and State of Missouri, have invented a new and useful Electric Heater, of which the following is a specification.

This invention relates to improvements in electric heaters and consists in the novel construction hereinafter disclosed.

An object of the invention is to provide an electric heater including a removable heating unit in connection with a permanent case so arranged that the removable unit may be readily replaced, with provision for maintaining a close contact between the elements resulting in efficiency in operation.

Another object of the invention is to provide a heater having improved features of construction adapting it for economical manufacture and convenient assembly of the parts.

Another object of the invention is to provide an improved heater comprising an outer case that may be inserted in and supported by the walls of a hot water storage tank, and a removable heating unit adapted for insertion in said case, there being a tapering contact between the adjacent walls of the case and the heating unit.

Additional features of the construction will be apparent without specific mention from the following detailed description of the invention taken in connection with the accompanying drawings, in which—

Fig. 1 is a top plan view of the heater.

Fig. 2 is a plan view of the heater with the top plate removed.

Fig. 3 is an inverted plan view of the heater.

Fig. 4 is a vertical longitudinal section through the heater.

Fig. 5 is a vertical cross section through the heater.

Fig. 6 is a detached view of the heating element in vertical side elevation.

Fig. 7 is a view of the same part in vertical edge elevation.

Fig. 8 is an inverted section view of the base of the heater.

Fig. 9 illustrates the form of a mica covering strip for the heating element.

Fig. 10 illustrates the heating element detached with the covering removed.

Fig. 11 is a detached view of the top plate of the heater.

Fig. 12 illustrates the form of terminal strips for the heater element.

Fig. 13 is an irregular section taken on the line 13—13 of Fig. 5.

In the embodiment of the invention illustrated in the drawings the heater is shown as including a socket member 1 having polygonal side walls and a tapering threaded extension 2. The threaded extension permits the heater to be threaded into an opening into a tank when the heater is used as a fluid heater. A flattened case 3 having its side walls tapering toward each other is inserted through an opening in the bottom wall of the member 1, and the upper edge of the case 3 is turned over forming flanges 4 at the points of contact between the members 1 and 3. A soldered or other tight joint is formed so that the case 3 becomes a rigid part of the member 1.

The removable heating element is made up of a base block 5 which is in the form of a circular disc with an oblong projection on the top wall. The heating element proper in the form shown in the drawing includes a core 6 of mica or other insulating material preferably in the form best shown in Fig. 10 of the drawing. It will be noted by reference to this view that the core is so arranged that the resistance wire 7 may be wound on the central portion of the core, the terminal elements being carried by an enlarged upper portion 8, the lower end of the core having an extension 9 so that the lead from the winding will be held out of contact with the winding and may be carried directly up to the top of the core for insertion with one of the terminal elements.

In making up the heating element the terminal elements 10 shown in Fig. 12 are attached directly to the upper portion 8 of the core by turning over the small projection 11 of the terminal elements, the terminal elements being attached to opposite faces of the section 8 of the core. The resistance wire is attached at one end to one of the terminal elements and wound about the central portion of the core, being carried through perforations 12 in the section 9 of the core. The end lead of the winding is carried up to the upper section of the core and attached to the opposite terminal element. After the unit has been wound in this manner insulating strips 13 in the form shown in Fig. 9 of the drawing are fitted over each side of the core and over the winding of resistance wire. The whole unit thus composed is then sheathed in a metallic case 14 formed preferably from a flat strip of punched out metal turned over to meet edge to edge, as illustrated in Fig. 6. The bottom edge of the case 14 is pressed together forming a closed bead 15, and the upper wall of the case carries two winged extensions 16. The side walls of the case 14 are formed with a downward taper conforming substantially to the inner contour of the walls of the case 3.

The heating unit is mounted in the base block to which it is removably attached by projecting the extensions 16 through openings 17 in the base block and then turning over the wings of the extensions, the perforations 17 being through the disc section of the base block. Terminal posts 18 are mounted in openings that extend through the base block at points substantially at right angles to the openings 17. The eyes 19 of the terminal elements 10 are turned over and connected with the lower ends of the binding posts 18, the upper ends of said posts extending upwardly of the top wall of the base block. The heating unit thus composed forms a separate element that is inserted through the top of the socket member 1 and extends into the case 3.

It will be noted that the thickness of the base block is somewhat less than the depth of the recess in the socket 1. Thus when the heating element is slipped into the case 3 it is free to move longitudinally thereof until prevented from further movement by the wedging action between the tapering walls of the case 14 and the case 3.

A top plate 20 is arranged to fit over the top of the socket 1, a projection of the base block 5 extending through an opening 21 in the top plate. Thus after the heating unit has been inserted in the case 3, the top plate is adjusted in place by screws 22 extending into threaded openings in the top edge of the member 1. As the top plate is adjusted in place pressure will be exerted on the base block of the heating unit, bringing the cases 3 and 14 into close wedging contact. This construction, providing for the wedging contact between the cases 3 and 14, has the purpose of contacting the case 14 closely against the heating element and also of bringing the walls of the cases 3 and 14 into intimate contact. This construction provides more perfect conduction from the heating coil. While the contact between the elements is an intimate contact, due to the pressure from screwing the top plate into place, nevertheless the heating unit may be readily removed by removing the top plate and then moving the heating element from side to side gradually pulling it outwardly from the case. The resiliency of the metal of both of the cases 3 and 14 tends to hold the cases into strong contact with each other.

While I have described a specific form of heating element, I do not limit myself to such a form as other types of resistance circuit may be utilized. In addition, other changes in the construction within equivalent limits may be made without departing from the spirit and scope of the invention. I do not limit myself therefore to the exact construction shown and described, but what I claim and desire to secure by Letters Patent, is:—

1. An electric heater, comprising a socket member having an open recess therein, a tapering case connected with the socket and opening thereinto, a heating element including a resistance circuit and a tapering case sheathing the resistance circuit adapted to be inserted in said first-named case, and means for effecting a wedging contact between the walls of said cases.

2. A heater, comprising a socket having a recess therein, a closed case connected with the socket, said case having an inwardly tapering inner wall, a removable heating unit including a resistance circuit and a case tapering in conformity with the inner wall of said first-named case, and a retaining plate adapted to press said two named cases into wedging contact with each other.

3. A heater, comprising a socket, a case closed at its outer end and communicating with the socket at its upper end, said case and socket being formed in rigid contact with each other, a base block insertable in the socket, a heating element in connection with the base block and having terminal elements extending outwardly from the socket, said heating element including a resistance circuit supported by the base block, a tapering case covering the resistance circuit and being adapted to be inserted in said first-named case, and a retaining plate arranged to press the tapering case into the other one to effect an intimate wedging contact between the walls of said cases.

4. A heater, comprising a socket, a tapering case closed at its outer end in connection with said socket and extending therefrom, a base block adapted for insertion in said socket, a case supported by said base block, a resistance circuit in said case, terminal elements in the base block connected with said resistance circuit, and a removable cover plate having screw connection with the socket and arranged to force said second-named case into intimate wedging contact with the tapering walls of said first-named case.

5. A heater, comprising a socket formed with a recess therein, a flattened case in connection with the socket being closed at one end and opening into the recess in the socket at its opposite end, the side walls of said case tapering inwardly, a base block mounted in said recess and arranged to move therein, a flattened case connected with the base block having its walls tapering to conform with the inner taper of said first-named case, and a cover plate for forcing the base block downwardly in the recess thereby effecting a wedging contact between said cases.

6. A heating element for a heater, comprising a central core of insulating material, separate terminal members attached to opposite sides of said core, a resistance coil carried by said core, a support in connection with said core for maintaining the terminal lead of the lower end of the coil out of contact therewith, insulating strips disposed over each side of the core and insulating the coil, a base block, terminal binding posts carried by the base block and connected with the terminal members, and a case supported by the base block and sheathing the heating element.

7. An electric heater, comprising a case, a heating element insertable in said case, and a wedging construction between said case and heating element, whereby an intimate contact is established between the heating element and said case.

8. An electric heater, comprising a case, a heating element comprising a substantially flat insulated resistance circuit insertable in said case, and a wedging construction between said case and heating element, whereby an intimate contact is established between the heating element and the case.

9. An electric heater, comprising a socket, a case projecting therefrom, said case having an inwardly tapering inner wall, a heating element insertable in said case, said heating element comprising a flat insulated resistance circuit clamped between opposing metallic walls, said metallic walls tapering in conformity with the inner wall of the aforesaid case.

10. An electric heater, comprising a socket member, a tapering case projecting therefrom, a heating element including an insulated resistance circuit and a tapering case sheathing said insulated resistance circuit adapted to be inserted in said first-named case, and means for effecting a wedging contact between the walls of said cases.

11. A heater, comprising a socket member, a case projecting from said socket member, said case having an inwardly tapering inner wall, and a heating unit including a resistance circuit and a case tapering in conformity with the inner wall of said first-named case adapted to be inserted thereinto, whereby a wedging connection between the case and heating element is effected.

12. A heating element for a heater, comprising a central core of insulating material, separate terminal members attached to opposite sides of said core, a resistance coil wound around said core, a support in connection with said core for maintaining the terminal lead of the lower end of the coil out of contact therewith, insulating strips disposed over each side of the core and insulating the coil, and a case sheathing the heating element.

13. An electric heater, comprising a case with inwardly tapering walls, a heating element insertable in said case, and means for effecting a wedging contact between said heating element and said case.

MAURICE SIMON.